(12) United States Patent
Colson et al.

(10) Patent No.: US 9,328,734 B2
(45) Date of Patent: May 3, 2016

(54) SEAL PLATE

(71) Applicant: Hamilton Sundstrand Corporation, Windsor Locks, CT (US)

(72) Inventors: Darryl A. Colson, West Suffield, CT (US); Clarence J. Wytas, Stafford Springs, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 541 days.

(21) Appl. No.: 13/899,620

(22) Filed: May 22, 2013

(65) Prior Publication Data

US 2014/0186161 A1 Jul. 3, 2014

Related U.S. Application Data

(60) Provisional application No. 61/746,650, filed on Dec. 28, 2012.

(51) Int. Cl.
| | |
|---|---|
| *F01D 25/24* | (2006.01) |
| *F04D 25/02* | (2006.01) |
| *F04D 17/12* | (2006.01) |
| *F04D 29/08* | (2006.01) |
| *F04D 29/42* | (2006.01) |
| *B64D 13/00* | (2006.01) |

(52) U.S. Cl.
CPC ............ *F04D 25/024* (2013.01); *F01D 25/243* (2013.01); *F04D 17/122* (2013.01); *F04D 29/083* (2013.01); *F04D 29/4206* (2013.01); *B64D 13/00* (2013.01); *Y10T 29/49236* (2015.01)

(58) Field of Classification Search
CPC ... F04D 25/024; F04D 17/122; F04D 29/083; F04D 29/4206; F01D 25/243
See application file for complete search history.

(56) References Cited

U.S. PATENT DOCUMENTS

| | | | |
|---|---|---|---|
| 5,224,842 A * | 7/1993 | Dziorny | F04D 29/102 417/406 |
| 7,402,020 B2 | 7/2008 | Beers et al. | |
| 2007/0134105 A1 | 6/2007 | Beers et al. | |
| 2012/0114463 A1 | 5/2012 | Beers et al. | |
| 2012/0156008 A1 | 6/2012 | Chrabascz et al. | |
| 2012/0156011 A1 | 6/2012 | Richardson et al. | |
| 2012/0156014 A1 | 6/2012 | Beers et al. | |
| 2013/0071239 A1 | 3/2013 | Beers et al. | |

* cited by examiner

*Primary Examiner* — Richard Edgar
(74) *Attorney, Agent, or Firm* — Cantor Colburn LLP

(57) ABSTRACT

A seal plate for an air cycle machine includes a substantially disk-shaped body having a first side configured to be coupled to a compressor housing of the air cycle machine and a second side configured to be coupled to a turbine housing of the air cycle machine. The seal plate also includes a timing pin slot configured to align the first side of the seal plate with the compressor housing. The seal plate further includes a plurality of fastener holes distributed radially in an asymmetric pattern. The plurality of fastener holes includes an alignment fastener hole configured to align the second side of the seal plate with the turbine housing. An angular offset between the alignment fastener hole and the timing pin slot is about 38.45 degrees.

20 Claims, 5 Drawing Sheets

SEAL PLATE

CROSS REFERENCE TO RELATED APPLICATIONS

This application claims priority to U.S. Provisional Patent Application Ser. No. 61/746,650, filed Dec. 28, 2012, the entire contents of which are specifically incorporated by reference herein.

BACKGROUND OF THE INVENTION

Exemplary embodiments of the invention generally relate to aircraft environmental control systems and, more particularly, to a seal plate of an air cycle machine utilized as part of an aircraft environmental control system.

Conventional aircraft environmental control systems (ECS) incorporate an air cycle machine (ACM), also referred to as an air cycle cooling machine, for cooling and dehumidifying air supplied to an aircraft cabin. ACMs commonly include at least one turbine and a compressor spaced axially at intervals on a common shaft. The turbine(s) and compressor are supported for rotation about the axis of the shaft by one or more bearing assemblies.

On aircraft powered by turbine engines, the air to be conditioned in the air cycle machine is typically compressed air bled from one or more compressor stages of a turbine engine. In conventional systems, this bleed air is passed through the air cycle machine compressor, where it is further compressed, then passed through a condensing heat exchanger to cool the compressed air. The heat exchanger sufficiently condenses moisture thereby dehumidifying the air. The dehumidified compressed air is then expanded in one of the turbines to extract energy from the compressed air so as to drive the shaft and also to cool the expanded turbine exhaust air as it is supplied to the cabin as conditioned cooling air.

A seal plate is typically used to separate the compressor and each turbine of the ACM. Seal plates may appear visually similar for a variety of compressor and turbine assembly configurations but may not be interchangeable due to application specific optimizations.

BRIEF DESCRIPTION OF THE INVENTION

According to one embodiment of the invention, a seal plate for an air cycle machine includes a substantially disk-shaped body having a first side configured to be coupled to a compressor housing of the air cycle machine and a second side configured to be coupled to a turbine housing of the air cycle machine. The seal plate also includes a timing pin slot configured to align the first side of the seal plate with the compressor housing. The seal plate further includes a plurality of fastener holes distributed radially in an asymmetric pattern. The plurality of fastener holes includes an alignment fastener hole configured to align the second side of the seal plate with the turbine housing. An angular offset between the alignment fastener hole and the timing pin slot is about 38.45 degrees.

According to another embodiment of the invention, an air cycle machine assembly is provided. The air cycle machine assembly includes a compressor housing, a turbine housing, and a seal plate. The seal plate includes a substantially disk-shaped body having a first side coupled to the compressor housing and a second side coupled to the turbine housing. The seal plate also includes a timing pin slot that aligns the first side of the seal plate with the compressor housing. The seal plate further includes a plurality of fastener holes distributed radially in an asymmetric pattern. The plurality of fastener holes includes an alignment fastener hole that aligns the second side of the seal plate with the turbine housing. An angular offset between the alignment fastener hole and the timing pin slot is about 38.45 degrees.

A method of installing a seal plate in an air cycle machine includes aligning a timing pin slot of a seal plate with a timing slot of a compressor housing of the air cycle machine. A first side of the seal plate is coupled to the compressor housing. An alignment fastener hole of the seal plate is aligned with a fastener alignment hole of the turbine housing. The alignment fastener hole of the seal plate is one of a plurality of fastener holes distributed radially in an asymmetric pattern. An angular offset between the alignment fastener hole of the seal plate and the timing pin slot is about 38.45 degrees. A second side of the seal plate is coupled to the turbine housing.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
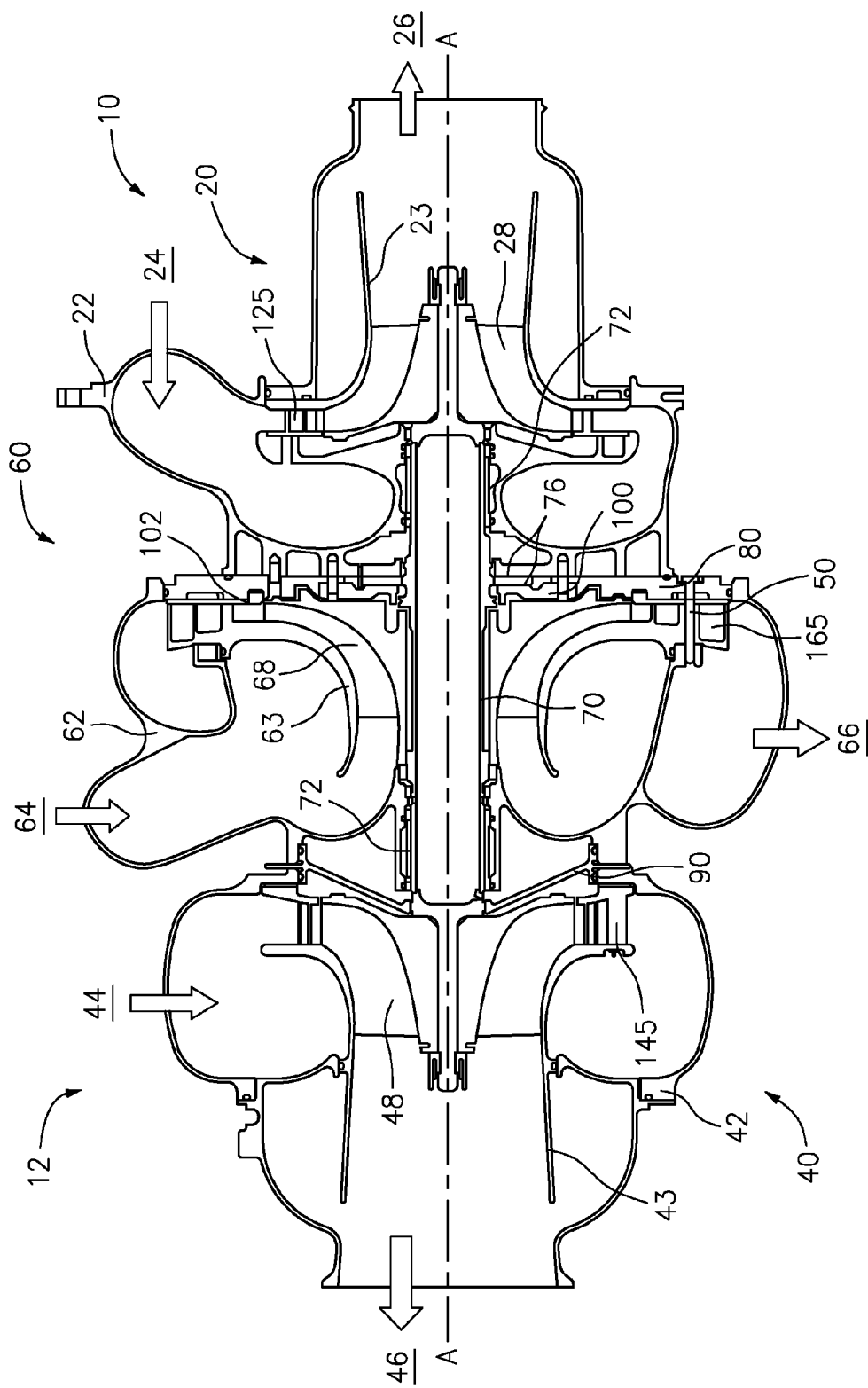
FIG. 1 is a cross-section of an air cycle machine (ACM) according to an embodiment.

Referring now to FIG. 1, an exemplary air cycle machine (ACM) 10 includes a first turbine 20, a second turbine 40, and a compressor 60. The ACM 10 includes a housing assembly 12 manufactured from multiple housing portions to provide a desired clearance for the compressor 60 and the turbines 20, 40. The ACM housing assembly 12 includes a first turbine housing 22, a compressor housing 62, and a second turbine housing 42. The ACM housing assembly 12 also includes first and second turbine shrouds 23 and 43, and a compressor shroud 63. The first turbine housing 22 and the second turbine housing 42 are connected to the centrally located compressor housing 62.

The first turbine 20 has an inlet 24, a nozzle 125, and an outlet 26. The second turbine 40 has an inlet 44, a nozzle 145, and an outlet 46. The compressor 60 also includes an inlet 64, a diffuser 165, and an outlet 66. The compressor 60 is driven by the first and second turbines 20 and 40. The first turbine 20 includes a first turbine rotor 28, the second turbine 40 includes a second turbine rotor 48, and the compressor 60 includes a compressor rotor 68. The first and second turbine rotors 28, 48 and the compressor rotor 68 are coupled to a shaft 70 for rotation about an axis A. In one embodiment, the shaft 70 is hollow and is supported within the ACM housing assembly 12 by bearings 72, such as hydrodynamic journal bearings, for example. The shaft 70 may include a plurality of apertures (not shown) such that a cooling flow enters into the shaft 70 to cool the bearings 72. Thrust bearings 76 are coupled to the shaft 70 to support axial loads in the ACM 10.

A first seal plate 80 separates air flow between the first turbine 20 and the compressor 60. A second seal plate 90 separates air flow between the compressor 60 and the second turbine 40. The first seal plate 80 is coupled to the first turbine housing 22 and the compressor housing 62. The second seal plate 90 is coupled to the second turbine housing 42 and the compressor housing 62. The first seal plate 80 is also coupled to a thrust plate 100 to constrain axial movement of the thrust bearings 76. A backing plate 102 may be installed between the diffuser 165 of the compressor 60 and the first seal plate 80. A plurality of fasteners 50, such as bolts, may be used to secure the seal plates 80 and 90. The illustrated ACM 10 is exemplary and other configurations known to a person skilled in the art are within the scope of this invention. A combination of two or more components of the ACM 10 is referred to generally as an ACM assembly.

Figure 2:
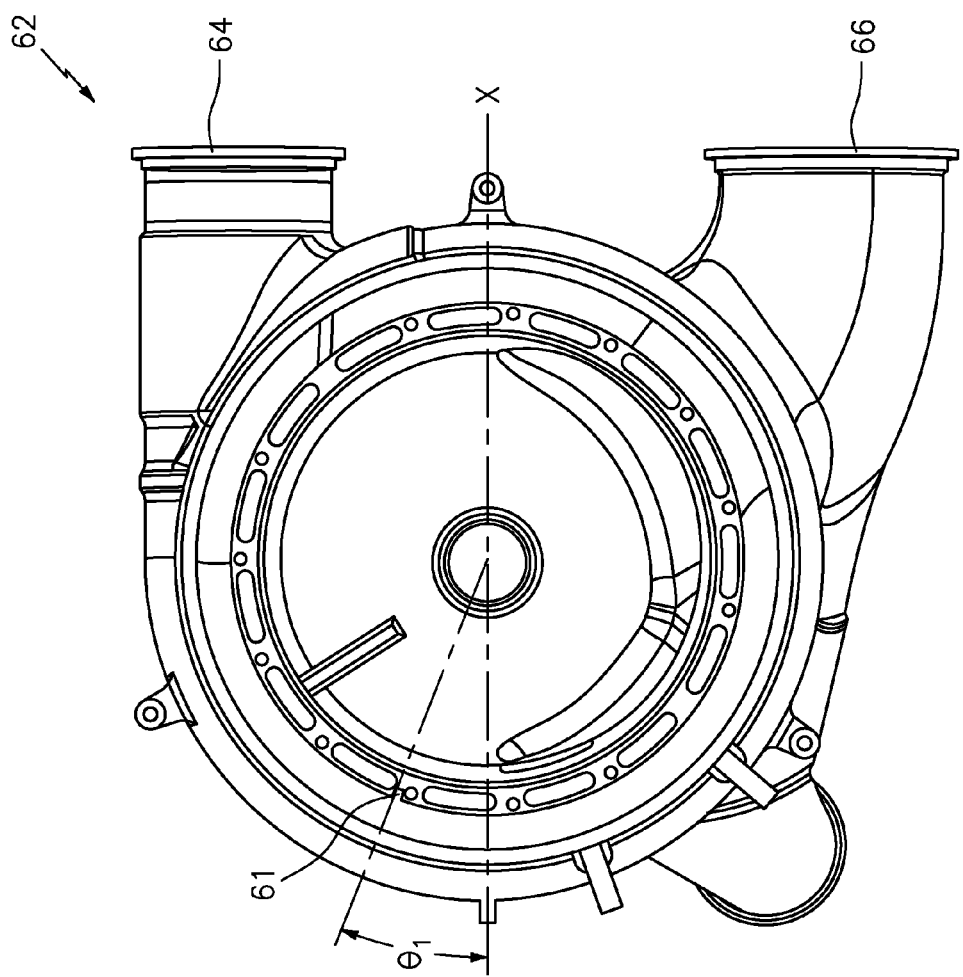
FIG. 2 is a view of a compressor housing of the ACM of FIG. 1 according to an embodiment.

Referring now to FIG. 2, the compressor housing 62 is illustrated in more detail. In one embodiment, the compressor housing 62 is manufactured from a single piece of cast material. The compressor housing 62 includes a timing slot 61 offset by an angle $\Theta_1$ relative to an axis X defined between the compressor inlet 64 and the compressor outlet 66. In an embodiment, the angle $\Theta_1$ is offset by about 22.05 degrees from axis X. The timing slot 61 is configured to receive a timing pin (not depicted) when assembling the ACM 10 of FIG. 1.

Figure 3:
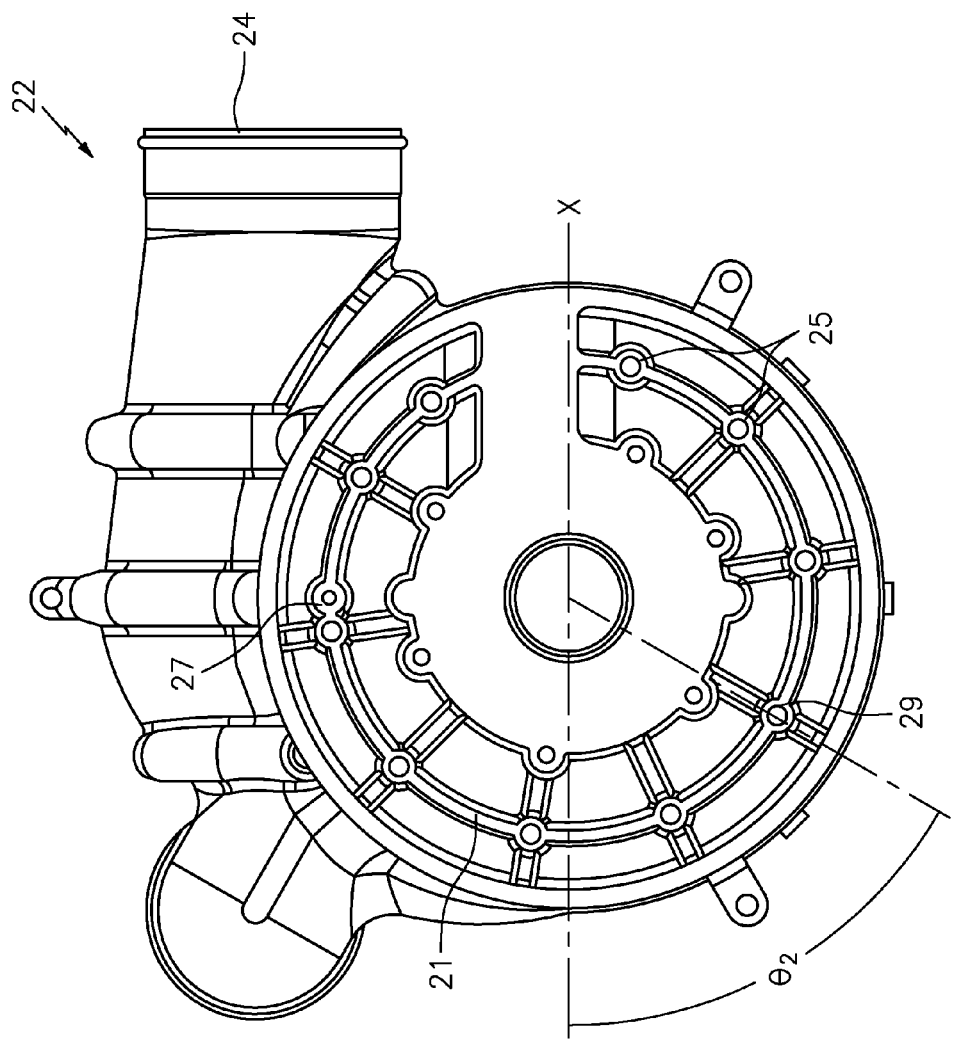
FIG. 3 is a view of a turbine housing of the ACM of FIG. 1 according to an embodiment.

FIG. 3 depicts the first turbine housing 22 of FIG. 1 in more detail. The first turbine housing 22 includes a number of fastener holes 25 distributed radially in an asymmetric pattern about a face 21 of the first turbine housing 22. One of the fastener holes 25 is designated as a fastener alignment hole 29. Axis X is defined normal to an alignment slot 27 of the first turbine housing 22, where the alignment slot 27 is proximate to a portion of the first turbine housing 22 that includes the turbine inlet 24. The fastener alignment hole 29 is offset by an angle $\Theta_2$ relative to axis X. In an embodiment, the angle $\Theta_2$ is offset by about 60.50 degrees from axis X. The fastener alignment hole 29 is configured to control alignment of the first turbine housing 22 relative to the first seal plate 80 of the ACM 10 of FIG. 1.

Figure 4:
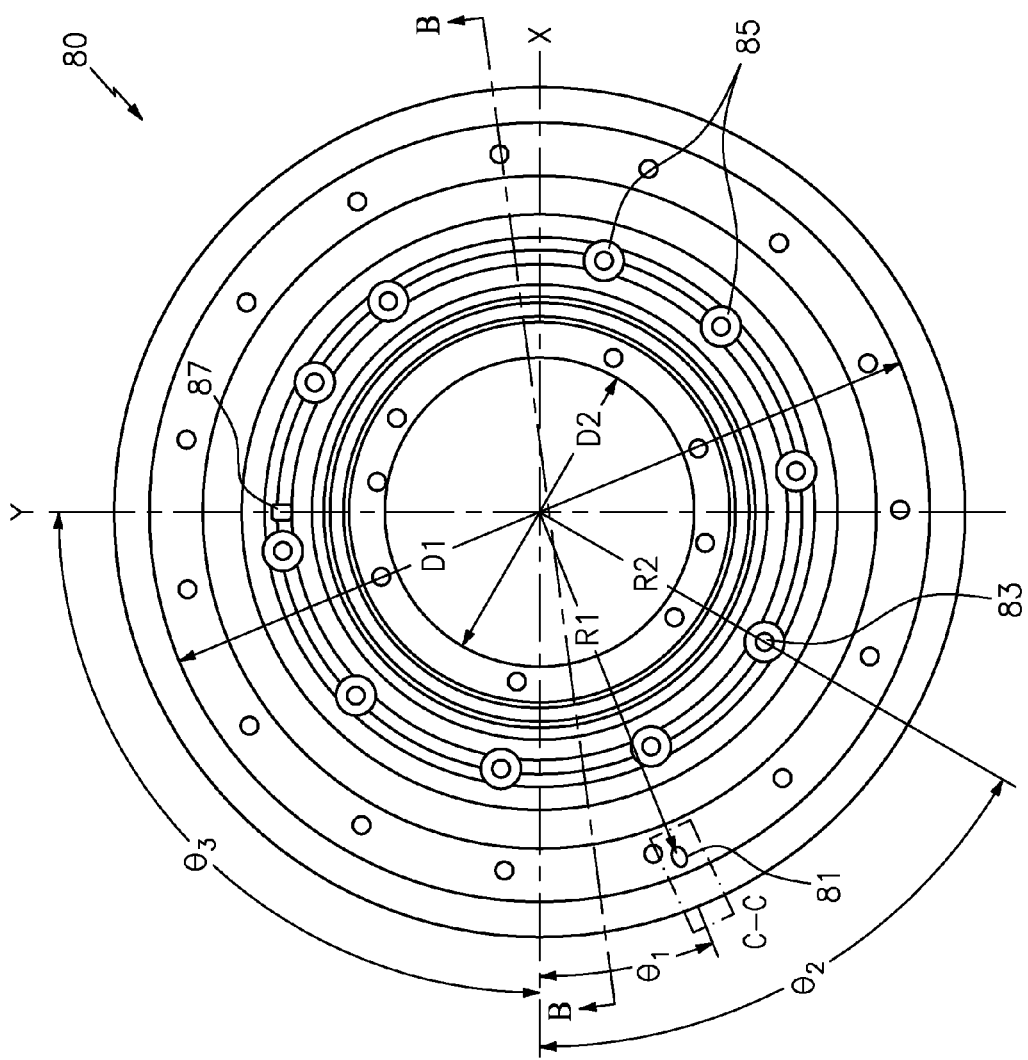
FIG. 4 is a view of a seal plate of the ACM of FIG. 1 according to an embodiment.

FIG. 4 depicts the first seal plate 80 of the ACM 10 of FIG. 1 according to an embodiment. The first seal plate 80 is a substantially disk-shaped body that includes a timing pin slot 81 and a plurality of fastener holes 85 distributed radially in an asymmetric pattern. One of the fastener holes 85 is designated as a fastener alignment hole 83. In an embodiment, there are ten fastener holes 85 including the fastener alignment hole 83. Axis X is defined normal to an alignment slot 87 of the first seal plate, and an axis Y intersects the alignment slot 87 normal to axis X. When the first seal plate 80 is coupled to the first turbine housing 22 upon assembling the ACM 10 of FIG. 1, the fastener alignment hole 83 substantially aligns with the fastener alignment hole 29 of FIG. 3, and the alignment slot 87 substantially aligns with the alignment slot 27 of FIG. 3. Additionally, the timing pin slot 81 aligns with the timing slot 61 of the compressor housing 62 of FIG. 2 when the first seal plate 80 is coupled to the compressor housing 62 of FIG. 2 in the ACM 10 of FIG. 1.

The timing pin slot 81 is offset by the angle $\Theta_1$ relative to axis X. The fastener alignment hole 83 is offset by the angle $\Theta_2$ relative to axis X. The axis X and axis Y are offset by an angle $\Theta_3$ relative to each other. In an embodiment, the angle $\Theta_1$ is offset by about 22.05 degrees from axis X, the angle $\Theta_2$ is offset by about 60.50 degrees from axis X, and the angle $\Theta_3$ is offset by about 90 degrees from axis X such that both the timing pin slot 81 and the fastener alignment hole 83 are offset by more than 90 degrees from the alignment slot 87. Accordingly, the timing pin slot 81 is offset from the alignment slot 87 by the sum of angle $\Theta_1$+angle $\Theta_3$, or about 112.05 degrees. The fastener alignment hole 83 is offset from the alignment slot 87 by the sum of angle $\Theta_2$+angle $\Theta_3$, or about 150.50 degrees. An angular offset between the timing pin slot 81 and the fastener alignment hole 83 ($\Theta_2$-$\Theta_1$) is about 38.45 degrees.

The timing pin slot 81 is positioned at a radius $R_1$ of about 6.58 inches (16.713 cm), and the fastener alignment hole 83 is positioned at a radius $R_2$ of about 4.585 inches (11.646 cm). An outer sealing diameter $D_1$ of the first seal plate 80 is about 13.825 inches (35.116 cm). A shaft bore diameter $D_2$ of the first seal plate 80 is about 5.46 inches (13.868 cm), where the shaft bore diameter $D_2$ is configured to receive the shaft 70 of FIG. 1. In an embodiment, a ratio of the outer sealing diameter $D_1$ to the radius $R_1$ is between 2.098 and 2.104, and a ratio the outer sealing diameter $D_1$ to the radius $R_2$ is between 3.010 and 3.020. A ratio of the outer sealing diameter $D_1$ to the shaft bore diameter $D_2$ may be between 2.528 and 2.536. A ratio of the radius $R_1$ to the radius $R_2$ is between 1.432 and 1.438.

Figure 5:
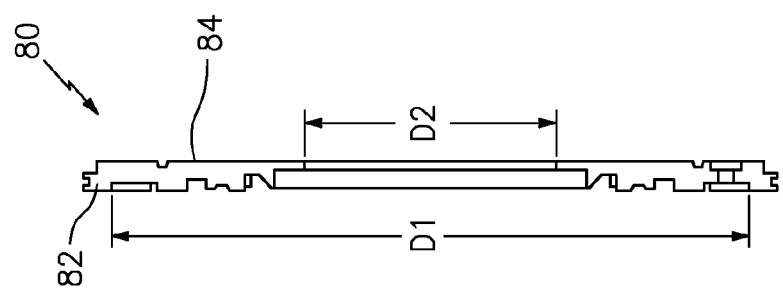
FIG. 5 is a cross-section view of the seal plate of FIG. 4 taken at line B-B.

FIG. 5 depicts cross-section view of the first seal plate 80 of FIG. 4 taken at line B-B. A first side 82 of the first seal plate 80 is configured to be coupled with the compressor housing 62 of FIG. 1. A second side 84 of the first seal plate 80 is configured to be coupled to the first turbine housing 22 of FIG. 1.

Figure 6:
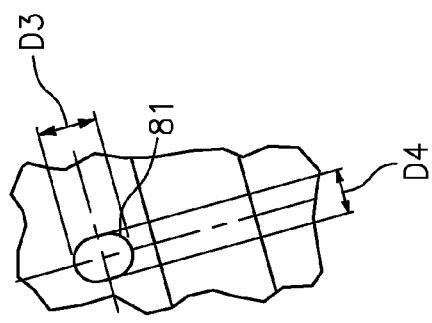
FIG. 6 is a detailed view of area C-C of FIG. 4.

FIG. 6 depicts a detailed view of area C-C at the timing pin slot 81 of the first seal plate 80 of FIG. 4. The timing pin slot 81 is defined by length $D_3$ and width $D_4$. In an embodiment, the length $D_3$ is about 0.33 inches (0.838 cm), and the width $D_4$ is about 0.253 inches (0.643 cm). A ratio of the length $D_3$ to the width $D_4$ may be between 1.235 and 1.375.

Figure 7:
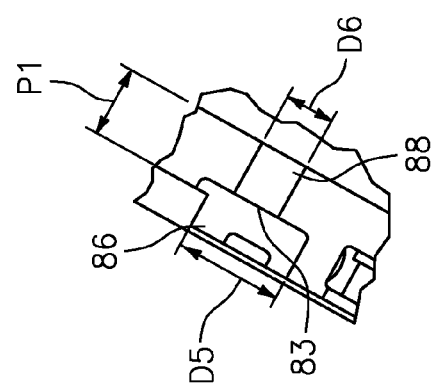
FIG. 7 is a cross-section of a fastener alignment hole of FIG. 4.

FIG. 7 depicts a cross-section of the fastener alignment hole 83 of FIG. 4. A fastener counter bore 86 has a fastener counter bore diameter $D_5$ of about 0.69 inches (1.753 cm). A fastener bore 88 has a fastener bore depth $P_1$ of about 0.32 inches (0.813 cm) and a fastener bore diameter $D_6$ of about 0.281 inches (0.714 cm). In an embodiment, a ratio of diameter $D_5$ to diameter $D_6$ is between 2.395 and 2.519. A ratio of the diameter $D_3$ to the diameter $D_6$ may be between 1.101 and 1.25. A ratio of the diameter $D_6$ to the diameter $D_4$ of FIG. 6 may be between 1.082 and 1.140. In an embodiment, a ratio of depth $P_1$ to diameter $D_6$ is between 1.101 and 1.178.

A process for installing the first seal plate 80 in the ACM 10 of FIG. 1 is described in reference to FIGS. 1-7. The process includes arranging the shaft 70 within the shaft bore diameter $D_2$ of the first seal plate 80 such that thrust bearings 76 are arranged proximate to the first side 82 of the first seal plate 80. The thrust plate 100 is positioned proximate to the first seal plate 80 and coupled to the first seal plate 80 to constrain axial movement of the thrust bearings 76. The timing pin slot 81 of the first seal plate 80 is aligned with the timing slot 61 of the compressor housing 62, and the first side 82 of the first seal plate 80 is coupled to the compressor housing 62. The alignment fastener hole 83 of the first seal plate 80 is aligned with the fastener alignment hole 29 of the first turbine housing 22 and the alignment slot 87 of the first seal plate 80 is aligned with the alignment slot 27 of the turbine housing 22. Upon alignment, the second side 84 of the first seal plate 80 is coupled to the first turbine housing 22. As previously described, the alignment fastener hole 83 of the first seal plate 80 is one of a plurality of fastener holes 85 distributed radially in an asymmetric pattern, and an angular offset between the alignment fastener hole 83 and the timing pin slot 81 is about 38.45 degrees. The sequence of assembly during installation of the first seal plate 80 in the ACM 10 can vary in embodiments.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A seal plate, comprising:
   a substantially disk-shaped body comprising a first side configured to be coupled to a compressor housing of an air cycle machine and a second side configured to be coupled to a turbine housing of the air cycle machine;
   a timing pin slot configured to align the first side of the seal plate with the compressor housing; and
   a plurality of fastener holes distributed radially in an asymmetric pattern, the plurality of fastener holes including an alignment fastener hole configured to align the second side of the seal plate with the turbine housing, wherein an angular offset between the alignment fastener hole and the timing pin slot is about 38.45 degrees.

2. The seal plate according to claim 1, further comprising an alignment slot offset by greater than 90 degrees from the timing pin slot and the alignment fastener hole.

3. The seal plate according to claim 2, wherein the timing pin slot has an angular offset of about 112.05 degrees from the alignment slot, and the alignment fastener hole has an angular offset of about 150.5 degrees from the alignment slot.

4. The seal plate according to claim 1, wherein the timing pin slot is positioned at a first radius of the seal plate, the alignment fastener hole is positioned at a second radius of the seal plate, and a ratio of the first radius to the second radius is between 1.432 and 1.438.

5. The seal plate according to claim 4, wherein the seal plate has an outer sealing diameter and a shaft bore diameter, wherein the shaft bore diameter is configured to receive a shaft of the air cycle machine, and a ratio of the outer sealing diameter to the shaft bore diameter is between 2.528 and 2.536.

6. The seal plate according to claim 5, wherein a ratio of the outer sealing diameter of the seal plate to the first radius of the seal plate is between 2.098 and 2.104, and a ratio of the outer sealing diameter of the seal plate to the second radius of the seal plate is between 3.010 and 3.020.

7. The seal plate according to claim 1, wherein the timing pin slot has a length and width having a ratio of 1.235 to 1.375 between the length and width.

8. The seal plate according to claim 1, wherein the alignment fastener hole comprises a fastener counter bore having a fastener counter bore diameter and a fastener bore having a fastener bore diameter and a fastener bore depth, wherein a ratio of the fastener counter bore diameter to the fastener bore diameter is between 2.395 and 2.519, and a ratio of the fastener bore depth to the fastener bore diameter is between 1.101 and 1.178.

9. An air cycle machine assembly comprising:
   a compressor housing;
   a turbine housing; and
   a seal plate comprising:
      a substantially disk-shaped body comprising a first side coupled to the compressor housing and a second side coupled to the turbine housing;
      a timing pin slot that aligns the first side of the seal plate with the compressor housing; and
      a plurality of fastener holes distributed radially in an asymmetric pattern, the plurality of fastener holes including an alignment fastener hole that aligns the second side of the seal plate with the turbine housing, wherein an angular offset between the alignment fastener hole and the timing pin slot is about 38.45 degrees.

10. The air cycle machine assembly according to claim 9, wherein the seal plate further comprises an alignment slot offset by greater than 90 degrees from the timing pin slot and the alignment fastener hole.

11. The air cycle machine assembly according to claim 10, wherein the timing pin slot has an angular offset of about 112.05 degrees from the alignment slot, and the alignment fastener hole has an angular offset of about 150.5 degrees from the alignment slot.

12. The air cycle machine assembly according to claim 9, wherein the timing pin slot is positioned at a first radius of the seal plate, the alignment fastener hole is positioned at a second radius of the seal plate, and a ratio of the first radius to the second radius is between 1.432 and 1.438.

13. The air cycle machine assembly according to claim 12, wherein the seal plate has an outer sealing diameter and a shaft bore diameter, wherein the shaft bore diameter is configured to receive a shaft, and a ratio of the outer sealing diameter to the shaft bore diameter is between 2.528 and 2.536.

14. The air cycle machine assembly according to claim 13, wherein a ratio of the outer sealing diameter of the seal plate to the first radius of the seal plate is between 2.098 and 2.104, and a ratio of the outer sealing diameter of the seal plate to the second radius of the seal plate is between 3.010 and 3.020.

15. The air cycle machine assembly according to claim 9, wherein the timing pin slot has a length and width having a ratio of 1.235 to 1.375 between the length and width.

16. The air cycle machine assembly according to claim 9, wherein the alignment fastener hole comprises a fastener counter bore having a fastener counter bore diameter and a fastener bore having a fastener bore diameter and a fastener bore depth, wherein a ratio of the fastener counter bore diameter to the fastener bore diameter is between 2.395 and 2.519, and a ratio of the fastener bore depth to the fastener bore diameter is between 1.101 and 1.178.

17. A method of installing a seal plate in an air cycle machine, comprising:
   aligning a timing pin slot of a seal plate with a timing slot of a compressor housing of the air cycle machine;
   coupling a first side of the seal plate to the compressor housing;
   aligning an alignment fastener hole of the seal plate with a fastener alignment hole of the turbine housing, wherein the alignment fastener hole of the seal plate is one of a plurality of fastener holes distributed radially in an asymmetric pattern, and an angular offset between the alignment fastener hole of the seal plate and the timing pin slot is about 38.45 degrees; and
   coupling a second side of the seal plate to the turbine housing.

18. The method according to claim 17, further comprising:
aligning an alignment slot of the seal plate with an alignment slot of the turbine housing, wherein the alignment slot of the seal plate is offset by greater than 90 degrees from the timing pin slot and the alignment fastener hole of the seal plate.

19. The method according to claim 17, wherein the timing pin slot is positioned at a first radius of the seal plate, the alignment fastener hole of the seal plate is positioned at a second radius of the seal plate, and a ratio of the first radius to the second radius is between 1.432 and 1.438.

20. The method according to claim 17, wherein the timing pin slot has a length and width having a ratio of 1.235 to 1.375 between the length and width, and the alignment fastener hole of the seal plate comprises a fastener counter bore having a fastener counter bore diameter and a fastener bore having a fastener bore diameter and a fastener bore depth, wherein a ratio of the fastener counter bore diameter to the fastener bore diameter is between 2.395 and 2.519, and a ratio of the fastener bore depth to the fastener bore diameter is between 1.101 and 1.178.

* * * * *